US012573206B2

(12) United States Patent
Grazioli et al.

(10) Patent No.: US 12,573,206 B2
(45) Date of Patent: Mar. 10, 2026

(54) BIRD'S-EYE VIEW ADAPTIVE INFERENCE RESOLUTION

(71) Applicant: GM Cruise Holdings LLC, San Francisco, CA (US)

(72) Inventors: Filippo Grazioli, Heidelberg (DE); Michael Meyer, Munich (DE); Sven Möller, Lubbecke (DE); Marc Unzueta, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 299 days.

(21) Appl. No.: 18/454,284

(22) Filed: Aug. 23, 2023

(65) Prior Publication Data

US 2025/0069410 A1    Feb. 27, 2025

(51) Int. Cl.
  *G06V 20/58*        (2022.01)
  *B60W 60/00*        (2020.01)
(52) U.S. Cl.
  CPC ........... *G06V 20/58* (2022.01); *B60W 60/001* (2020.02); *B60W 2420/403* (2013.01)
(58) Field of Classification Search
  CPC ...... G06V 20/58; G06V 20/56; G06V 10/454; G06V 10/22; G06V 10/25; G06V 10/50; G06V 10/82; G06V 10/764; B60W 60/001; B60W 2420/403
  See application file for complete search history.

(56) References Cited

U.S. PATENT DOCUMENTS

2023/0186077 A1 *  6/2023  Yin ........................ G06N 3/045
                                                 706/15

OTHER PUBLICATIONS

Ye, Mao, Gregory P. Meyer, Yuning Chai, and Qiang Liu. "Efficient transformer-based 3d object detection with dynamic token halting." In Proceedings of the IEEE/CVF International Conference on Computer Vision, pp. 8438-8450. 2023. (Year: 2023).*

(Continued)

*Primary Examiner* — Carol W Chan
(74) *Attorney, Agent, or Firm* — CANTOR COLBURN LLP

(57)        ABSTRACT

A method includes dividing an image into a plurality of patches; generating for the patches image tokens each including a halting score associated with the image token; generating a contextual features token representative of at least one contextual feature in connection with the image; processing the image tokens and the contextual features token using a vision transformer block; performing adaptive halting on the image tokens output from the transformer block, the adaptive halting comprising updating the halting scores associated with the image tokens and discarding ones of the image tokens having halting scores greater than or equal to a predetermined threshold score, wherein the non-discarded image tokens comprise remaining image tokens; and forwarding the remaining image tokens to a next processing block.

17 Claims, 6 Drawing Sheets

(56) References Cited

OTHER PUBLICATIONS

Wang, Zekun, Jingchang Chen, Wangchunshu Zhou, Ming Liu, and Bing Qin. "Smarttrim: Adaptive tokens and parameters pruning for efficient vision-language models." CoRR (2023). (Year: 2023).*

Dosovitskly et al., An Image is Work 16x16 Words: Transformers for Image Recognition at Scale, arXiv:2010.11929v2 [cs.CV] Jun. 3, 2021, 22 pages.

Vasani et al., Attention Is All You Need, arXiv:1706.03762v5 [cs.CL] Dec. 6, 2017, 15 pages.

Yin et al., A-ViT: Adaptive Tokens for Efficient Vision Transformer, arXiv:2112.07658v3 [cs.CV] Oct. 5, 2022, 12 pages.

* cited by examiner

502 — RECEIVE IMAGE
DATA FROM SENSOR

504 — ADJUST RESOLUTION OF IMAGE DATA
BASED ON WEIGHTED COMBINATION OF
CONTEXTUAL FEATURES

506 — PROVIDE RESOLUTION-ADJUSTED
IMAGE DATA TO TASK-SPECIFIC PROCESS

BIRD'S-EYE VIEW ADAPTIVE INFERENCE RESOLUTION

CROSS REFERENCE TO RELATED APPLICATION

This application claims the benefit of European Patent Application No. 23 192 701.3 filed Aug. 22, 2023, which is incorporated by reference in its entirety.

BACKGROUND

Technical Field

The present disclosure relates generally to autonomous vehicles (AVs) and, more specifically, to techniques for performing bird's-eye view (BEV) adaptive inference resolution in connection with such AVs.

Introduction

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3 illustrates a more detailed block diagram of a portion of a system for performing BEV adaptive inference resolution according to some aspects of the disclosed technology;

DETAILED DESCRIPTION

Overview

Figure 1:
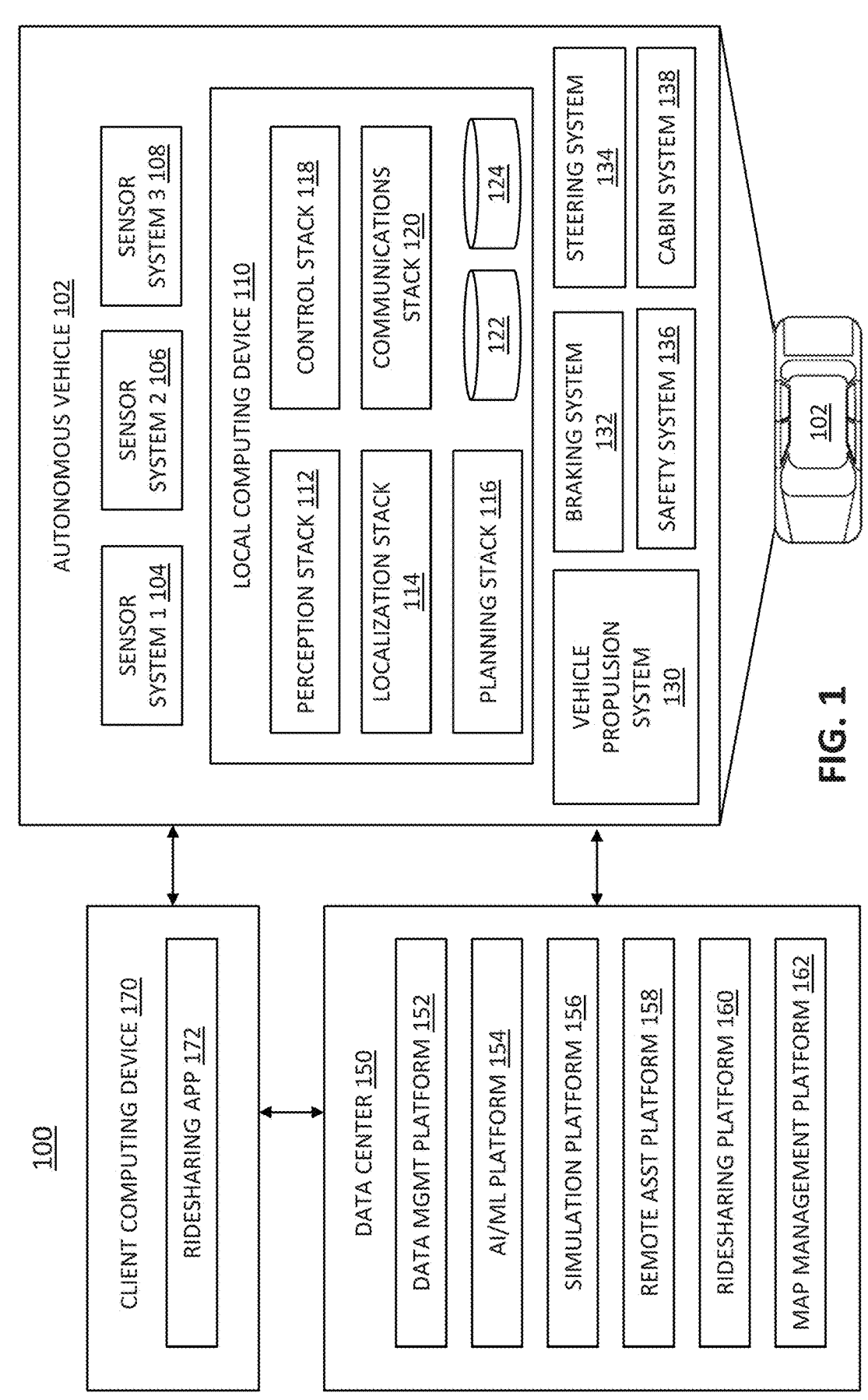
FIG. 1 illustrates an example system environment that can be used to facilitate AV (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

BEV representations may be beneficially employed in a wide range of technological fields, including computer vision and robotics, for example. BEV representations are commonly employed for performing three-dimensional (3D) object detection but may also be used for other applications, including but not limited to simultaneous localization and mapping (SLAM). In particular embodiments, different resolutions of a BEV representation may be useful for an application, such as autonomous driving, depending on contextual features that may affect how much and/or what type of BEV representation detail may be necessary in a given operational context.

Contextual features may include, but are not limited to, weather conditions, vehicle speed, road type (e.g., highways vs. rural routes), traffic density, pedestrian density, a time of day, environmental conditions, geographic location, and an amount of free space in front of an autonomous (or EGO) vehicle (AV), to name a few. For example, higher resolution BEV representations may be used when the need for accuracy in a given operational context (e.g., due to safety concerns) outweighs the desire to avoid additional computational costs associated with higher resolution processing, such as may be the case when an AV is traversing a crowded highway at a high speed. In contrast, lower resolution BEV representations may be used in situations in which there is a less urgent need for accuracy in a given operational context, in which case the computational costs associated with higher resolution processing may be spared by using lower resolution processing, such as may be the case when an AV is traversing an empty road at a low speed. Similarly, when an AV is traveling at a high speed, it may be beneficial to focus processing on regions that are farther ahead of the vehicle, whereas when a vehicle is traveling at a low speed, it may be beneficial to focus on regions closer to the vehicle.

In another example, if the weather is sunny and clear, lower resolution images may be sufficient for a particular purpose, whereas if the weather is overcast and cloudy and/or rainy, higher resolution images may be desirable. Similarly, in areas where there is high pedestrian traffic, higher resolution processing may be desirable over processing images at a lower resolution to ensure that pedestrians are appropriately identified and located. Conversely, in areas where there is low pedestrian traffic, lower resolution processing may be sufficient.

In accordance with features of embodiments described herein, techniques are provided for adaptively adjusting the inference cost of BEV representations based on contextual features, including but not limited to those indicated above. Such contextual features may be determined using onboard sensors of the AV or other AVs, mapping information, or other data available to the AV (e.g., via remote data system to which the AV is connected). In particular embodiments, a Vision Transformer (ViT) is employed to split a BEV image into patches, which patches are then encoded into vectors (referred to as tokens) and processed using a self-attention mechanism. As will be described in greater detail hereinbelow, in accordance with features of embodiments described herein, the number of tokens processed at inference time is adaptively reduced based on contextual features encoded as a vector (or a contextual features token), which is concatenated with the tokens, resulting in a more efficient processing of BEV representations. Intuitively, contextual features (e.g., vehicle speed, free space in front of the vehicle, road type, weather conditions, etc.) may be used as constraints on an ideal resolution of BEV representations. Embodiments described herein provide a method that adaptively learns to process only those patches of a BEV image that are most relevant to a given task, with the remainder of the patches being ignored or discarded. This process may be viewed as adaptive down sampling of BEV image data based on contextual features.

As described in greater detail below, particular embodiments employ and/or consider contextual features to adaptively adjust (and attempt to optimize) the inference costs of BEV representations. In particular embodiments, contextual features are employed to estimate a halting probability of each image token at inference time in order to reduce inference cost. Still further, particular embodiments adaptively learn to adjust (i.e., reduce) the resolution of BEV resolutions based on identified contextual features.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., $110a$-$110e$), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example System for BEV Adaptive Inference Resolution

Transformers are a class of neural network architecture that computes network outputs using highly expressive attention (and particularly self-attention) mechanisms. While transformers have their roots in natural language processing (NLP) applications, vision transformers (ViTs) have been increasingly employed in vision applications such as image classification, object detection, image generation, and semantic segmentation. In ViT, an input image is split into a series of ordered patches each represented by a token comprising a linear embedding of the corresponding patch. The transformer implements self-attention in layers, performing inter- and infra-calculations between tokens to solve the underlying task.

In particular embodiments, an image:

$$x \in \mathbb{R}^{H \times W \times C}$$

is reshaped into a sequence of flattened two dimensional (2D) patches:

$$x_p \in \mathbb{R}^{N \times (P^2 \cdot C)}$$

where (H,W) is the resolution of the original image, C is the number of channels, (P,P) is the resolution of each image patch, and $N=HW/P^2$ is the resulting number of patches, which is also the effective input sequence length for the transformer. Position embodiments may be added to the patch embeddings to retain positional information.

An input-dependent adaptive inference mechanism may be used in connection with vision transformers, such as described above. In particular, a spatially adaptive inference mechanism may halt the computation of different tokens at different depths, reserving compute for only discriminative tokens in a dynamic manner. This mechanism will be referred to hereinbelow as adaptive halting.

As used herein, the term vision transformer, or ViT, is a type of transformer that is targeted at vision processing tasks, such as image recognition. Transformers measure relationships between pairs of input tokens, referred to as attention. The cost is quadratic in the number of tokens. For images, the basic unit of analysis may be the pixel; however, computing relationships for every pixel pair in a typical image would be prohibitive in terms of memory and computational requirements. To address this issue, VIT computes relationships among pixels in various small (e.g., 16×16 pixels) sections, or patches, of the image, thereby significantly reducing memory and computational cost. The sections along with positional embeddings are arranged in a sequence. The embeddings are learnable vectors and each patch is arranged into a linear sequence and multiplied by the embedding matrix, the result of which is fed into the transformer along with the position embedding. In accordance with features of embodiments described herein, an adaptive halting mechanism is employed in combination with ViT to adaptively adjusts the inference cost of ViT for images of different complexity. The adaptive halting mechanism achieves this by automatically reducing the number of tokens in ViT that are processed in the network as inference proceeds.

Figure 2:
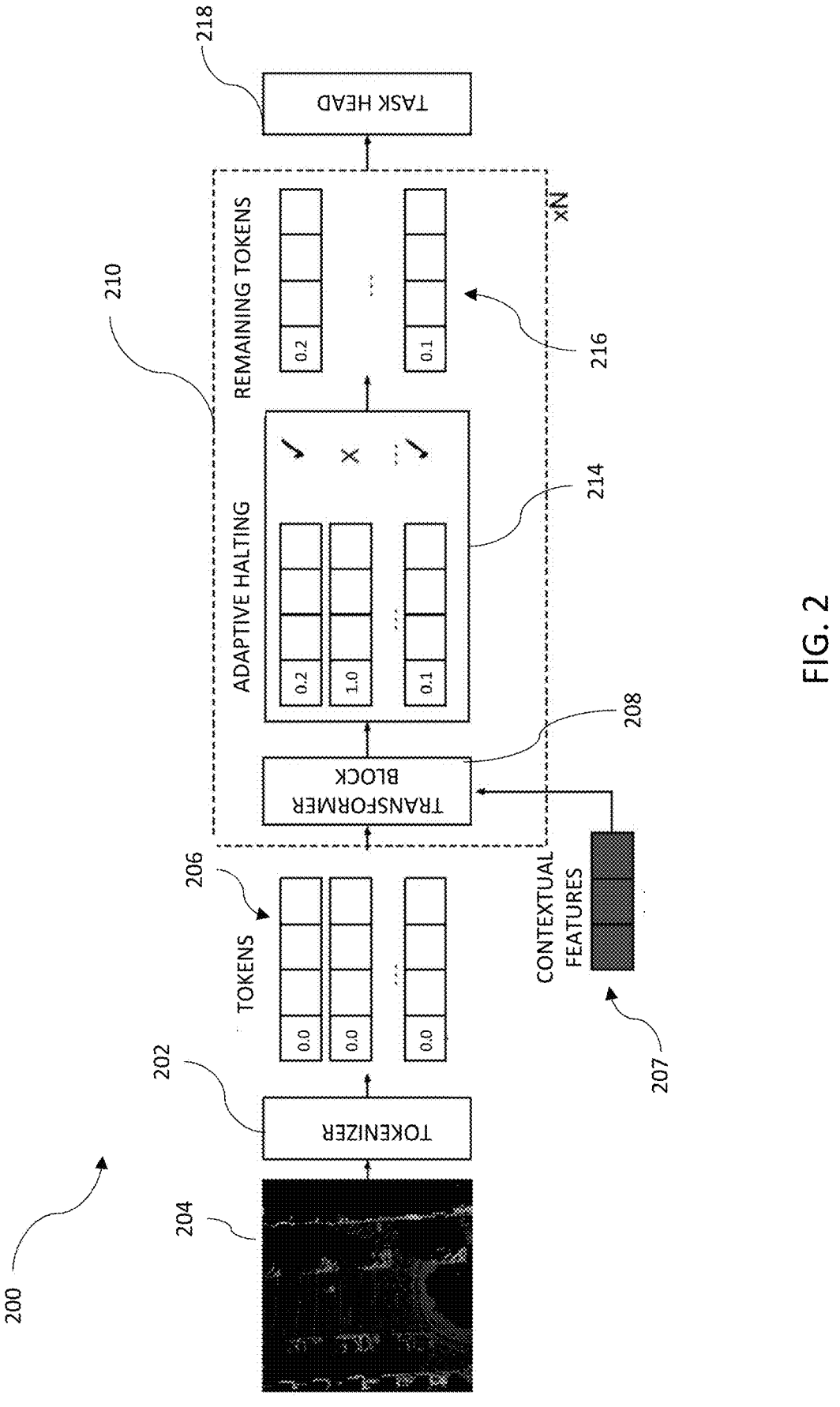
FIG. 2 illustrates a simplified block diagram of a system for performing BEV adaptive inference resolution according to some aspects of the disclosed technology.

FIG. 2 illustrates a high level block diagram of a system 200 for performing BEV adaptive inference resolution in accordance with embodiments described herein. As shown in FIG. 2, system 200 includes a tokenizer 202 for splitting an image 204, which may be a BEV image for use in controlling operations of an AV, into a plurality of patches and computing a token 206 for each of the patches. In particular embodiments, a token comprises a linear embedding of the corresponding patch. Image 204 may comprise sensor data, such as a LIDAR point cloud or computer vision image, generated by one or more onboard sensors of an AV.

In accordance with features of embodiments described herein, a halting probability score, or value, is concatenated with each of tokens 206. Halting probability score is initially set to 0.0 for all tokens. Tokens 206 are combined with a contextual features 207 (as described in greater detail in FIG. 3) and input to a transformer block 208 of a first one of a plurality of halting BEV transformer layers 210. Halting BEV transformer may comprise a hierarchical transformer including a representation computed with shifted windows.

At each layer, transformer block 208 processes tokens 206 and contextual features 207 together using self-attention mechanisms. An adaptive halting module 214 updates the halting probability score, or halting probability value, for each of the tokens and discards tokens having a halting probability score greater than or equal to a predetermined threshold value (i.e., once the token reaches the halting condition). As a result, transformers in successive blocks, or layers, gradually receive fewer tokens, leading to faster inference and retention of relevant information based on contextual features. Remaining tokens (i.e., tokens that have not been discarded as having a halting probability score greater than a predetermined threshold value during the inference process) are output to a task head comprising a task-specific process (e.g., 3D object detection) 218 for processing.

In particular embodiments, the halting process (i.e., discarding tokens during inference) may be encouraged by the addition of a halting loss $L_H$, which aims at maximizing the halting probability scores of all tokens. Assuming the simultaneous existence of a task loss $L_T$ (e.g., specific to a 3D object detection task), dropping tokens will result in less information and hence worse performance of the task. Optimizing a joint loss $L_T + L_H$ will result in learning an optimal tradeoff between toe two losses; that is between the task and computational efficiency.

Figure 3:
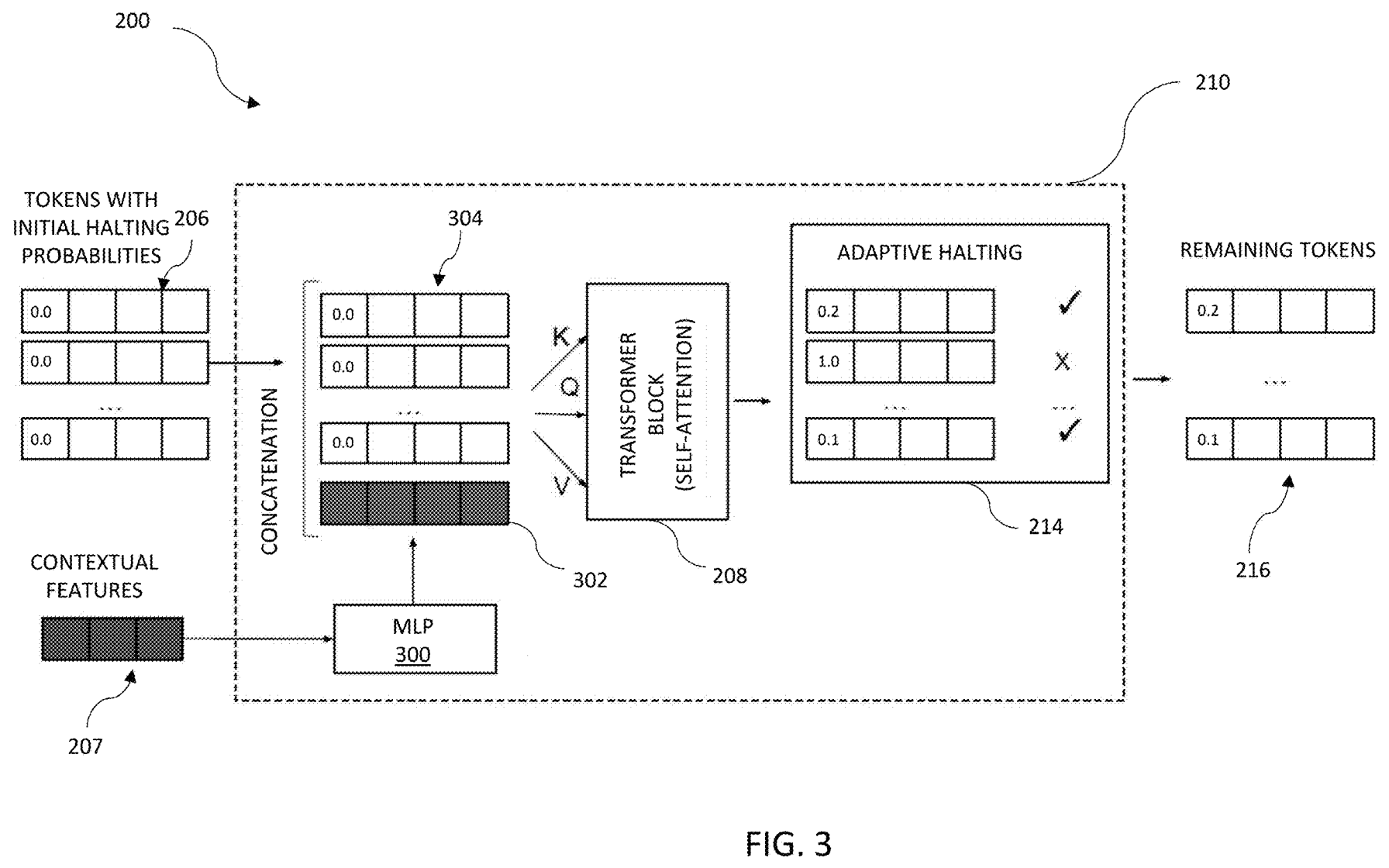

Referring now to FIG. 3, illustrated therein is a more detailed block diagram of a single halting BEV transformer layer 210. As best shown in FIG. 3, contextual features 207 may be input to a multilayer perceptron (MLP) 300 of halting BEV transformer layer 210, which encodes the features 207 as a token (or vector) 302 having the same dimensionality as tokens 206. For discrete context classes (e.g., rain vs sunny vs fog), contextual features may be implemented as a learned embedding, for which the $n^{th}$ class is represented by the $n^{th}$ embedding feature vector. For continuous context input (e.g., velocity), the input can be discretized, and the same method can be used. Alternatively, an MLP can be used to convert the input to desired feature. Multiple contextual features can be concatenated to form the contextual token, which has the dimension as the other tokens.

Context features may include, but are not limited to, those listed in Table 1 below:

TABLE 1

| INFORMATION | DATA TYPE |
| --- | --- |
| weather information | discrete classes (e.g., rain, fog, sun, etc.) |
| speed | continuous scalar or continuous vector |
| road type | discrete classes (e.g., urban road, highway, rural road, etc.) |
| free space | continuous vector |

All context features may be represented in a single vector by stacking them (e.g., [weather, speed, road type, free space, etc.]). Discrete variables may be represented by integers, while continuous ones may be represented by floats. The vector is processed by a non-linear derivable function (e.g., MLP) and the resulting embedding is fed into the transformer. Alternatively, a special treatment may be reserved for discrete vectors by using a linear embedding layer meant to learn vector representation for entities that are normally identifiers. The resulting embeddings obtained by the embedding layer can then be further processed by an MLP to allow non-linear mappings, as described above, which are then fed into the transformer.

It will be recognized that in alternative embodiments, more than one contextual features token 302 may be generated and concatenated to tokens 206. Contextual features token 302 is concatenated with tokens 206 at 304 and input to transformer block 208 as N×M matrices. As noted above, transformer block 208 performs self-attention processing on tokens 206, 304, and outputs values to adaptive halting module 214, which as noted above updates the halting probability score of each of tokens 206 and drops tokens having a halting probability score equal to a predetermined threshold score (e.g., 1.0). As also noted above, remaining tokens 216 are output to a next halting BEV transformer layer or to task head 218 (FIG. 2).

Example Techniques for BEV Adaptive Inference Resolution

Figure 4:
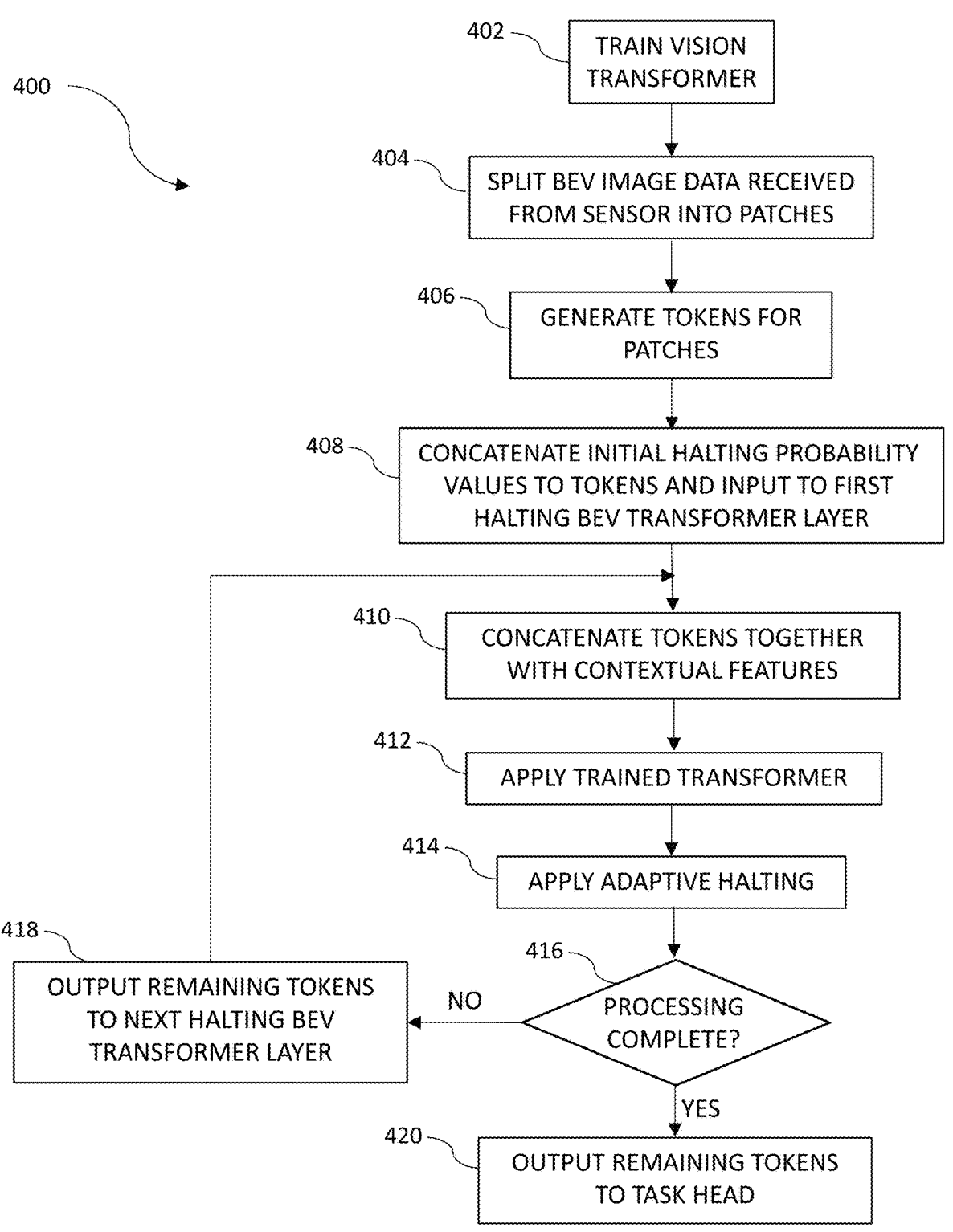
FIG. 4 illustrates a flow diagram of example operations for performing BEV adaptive inference resolution according to some aspects of the disclosed technology.

FIG. 4 illustrates a flow diagram 400 of example operations for performing BEV adaptive inference resolution according to some aspects of the disclosed technology. In certain embodiments, one or more of the operations illustrated in FIG. 4 may be executed by one or more of the elements shown in FIGS. 1, 2, and/or 3.

In 402, a vision transformer is trained using appropriate training data to perform BEV adaptive inference resolution in accordance with embodiments described herein. An additional loss term may be used during training to make the distribution of halting probabilities follow a specific distribution. This defines the number of desired patches.

In 404, a BEV image comprising data generated by at least one image sensor is split into patches.

In 406, a token is generated for each of the patches. Generation of tokens for patches may be performed by tokenizer 202 (FIG. 2).

In 408, initial halting probability values are concatenated to tokens and tokens with initial halting probability values concatenated thereto are input to first halting BEV transformation layer.

In 410, contextual features are tokenized (e.g., by an MLP such as MLP 300 (FIG. 3)) and concatenated with input tokens.

In 412, the trained transformer is applied to tokens including contextual features token.

In 414, adaptive halting is applied to tokens output from trained transformer. In particular, halting probability values of tokens are updated and tokens with halting probability values that meet or exceed a predetermined threshold value are dropped, discarded, or otherwise ignored. It will be recognized that there may be other ways of determining which tokens should be dropped based on respective halting probability scores. For example, in particular embodiments, instead of comparing the score to a threshold and dropping tokens whose scores meet or exceed the threshold, a certain percentile or number of tokens having the highest halting probability scores may be dropped at each layer (which percentage or number may change on a layer-by-layer basis). The threshold value can also be dependent on the available compute at that time.

In 416, a determination is made whether processing has been completed (e.g., whether the current halting BEV transformer layer is the final, or $n^{th}$, layer). If not, in 418, the remaining tokens (i.e., the tokens that have not been dropped, discarded, or otherwise ignored) are output to the next halting BEV transformer layer. Otherwise, in 420, the remaining tokens are output to the task head for task-specific processing.

Although the operations of the example method shown in and described with reference to FIG. 4 are illustrated as occurring once each and in a particular order, it will be recognized that the operations may be performed in any suitable order and repeated as desired. Additionally, one or more operations may be performed in parallel. Furthermore, the operations illustrated in FIG. 4 may be combined or may include more or fewer details than described.

Figure 5:
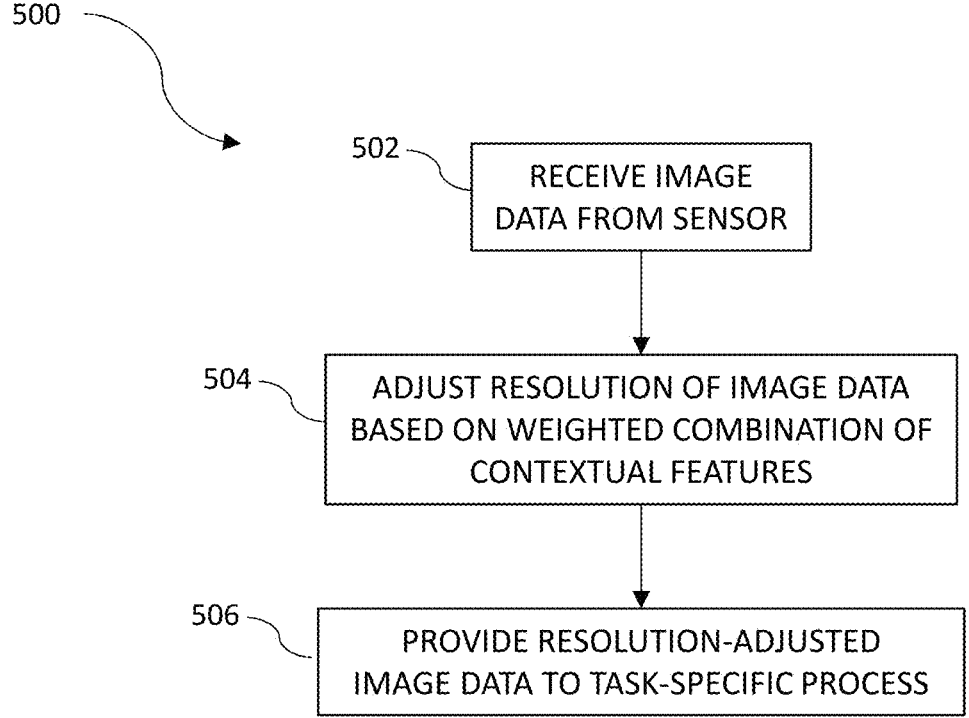
FIG. 5 illustrates a flow diagram of example operations for performing a naïve version of BEV adaptive inference resolution according to some aspects of the disclosed technology.

FIG. 5 illustrates a flow diagram 500 of example operations for performing a naïve version of BEV adaptive inference resolution according to some aspects of the disclosed technology. In certain embodiments, one or more of the operations illustrated in FIG. 5 may be executed by one or more of the elements shown in FIGS. 1, 2, and/or 3. Additionally, in certain embodiments, flow diagram 500 may be viewed as a high level (more abstracted) version of flow diagram 400.

In 502, a BEV image comprising data generated by at least one image sensor is received for processing.

In 504, the received BEV image data is down sampled or otherwise filtered or resolution-adjusted based on one or more contextual features, such as the contextual features noted above. For example, assuming the contextual features indicate that the AV for which the BEV data was provided is traveling at a high speed on a crowded highway, in particular embodiments, the BEV image data may be down sampled such that pixels corresponding to points within a certain distance ahead of the AV may be discarded at a particular (non-zero) rate, whereas pixels corresponding to points farther ahead of the AV may be retained or discarded at a lower rate. Pixels corresponding to points in between may be discarded at a lower rate than the first set of pixels (i.e., pixels corresponding to points closer to the AV) but at a higher rate than the second set (i.e., pixels corresponding to points more distant from the AV). The reverse may be true for a vehicle traveling at a low speed. It will be recognized that, in cases in which multiple contextual features are considered, the contextual features may be weighted with their weights affecting the rate at which corresponding pixels may be discarded or retained. Additionally and/or alternatively, in particular embodiments, if the contextual features indicate that the vehicle is traveling at a speed of X, full resolution images may be required, whereas if the contextual features indicate that the vehicle is traveling at a speed 0.5×, then 50% of full resolution may be required.

In 506, the resolution-adjusted image data is provided to the task head for processing. It will be recognized that in some instances, no down sampling will have taken place, in which case, in 506 the full resolution image data is provided to the task head.

Although the operations of the example method shown in and described with reference to FIG. 5 are illustrated as occurring once each and in a particular order, it will be recognized that the operations may be performed in any suitable order and repeated as desired. Additionally, one or more operations may be performed in parallel. Furthermore, the operations illustrated in FIG. 5 may be combined or may include more or fewer details than described.

Example Processor-Based System

Figure 6:
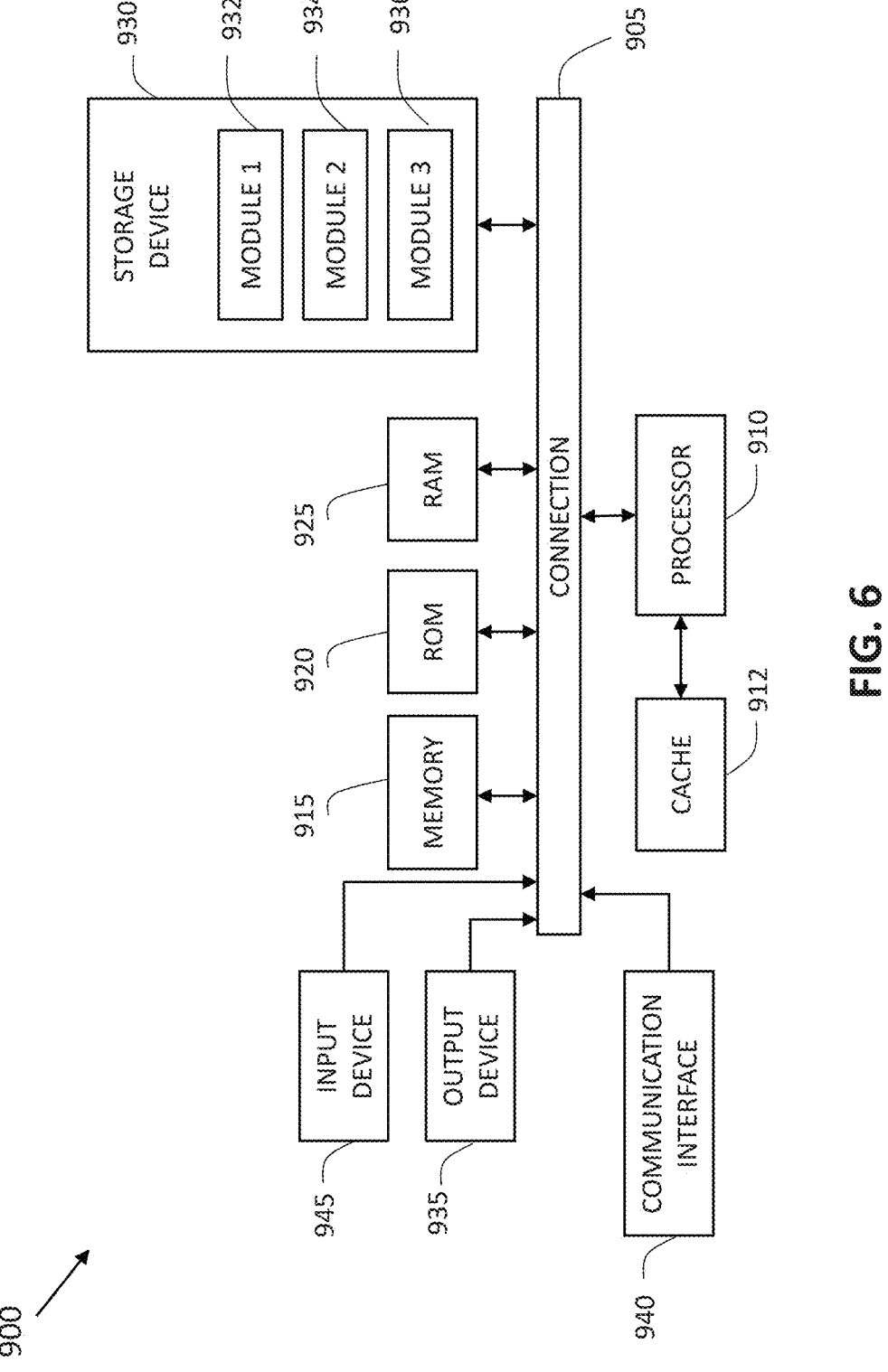
FIG. 6 illustrates an example processor-based system with which some aspects of the disclosed technology can be implemented.

FIG. 6 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more GNSS receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a method for adaptive inference resolution of an image, the method comprising dividing the image into a plurality of patches; generating image tokens for the patches, wherein each of the image tokens includes a halting score associated with the image token; generating a contextual features token representative of at least one contextual feature in connection with the image; processing the image tokens and the contextual features token using a vision transformer block; performing adaptive halting on the image tokens output from the transformer block, the adaptive halting comprising updating the halting scores associated with the image tokens and discarding ones of the image tokens having halting scores greater than or equal to a predetermined threshold score, wherein the non-discarded image tokens comprise remaining image tokens; and forwarding the remaining image tokens to a next processing block.

Example 2 provides the method of example 1, wherein the next processing block is a transformer block of a next transformer layer.

Example 3 provides the method of example 1 or 2, wherein the next processing block is a task-specific process.

Example 4 provides the method of any of examples 1-3, wherein the at least one contextual feature comprises at least one of a speed of a vehicle, a weather condition, an environmental condition, a time of day, a road type, traffic density, pedestrian density, a geographic location, and an amount of free space in front of the vehicle.

Example 5 provides the method any of examples 1-4, wherein the at least one contextual feature is determined using data generated by sensors installed on a vehicle.

Example 6 provides the method any of examples 1-5, wherein the at least one contextual feature is determined using mapping data.

Example 7 provides the method any of examples 1-6, wherein the at least one contextual feature is determined using fleet vehicle data available to a remote data center.

Example 8 provides the method any of examples 1-7, wherein the image is a bird's-eye view image.

Example 9 provides the method any of examples 1-8, wherein the BEV image comprises a light detection and ranging (LIDAR) point cloud.

Example 10 provides a system for performing adaptive inference resolution of an image in connection with a vehicle, the system comprising a tokenizer for dividing the image into a plurality of patches and generating tokens for the patches, wherein each of the tokens includes a halting score associated with the image token; and a halting transformer layer comprising a vision transformer (ViT) for receiving the tokens and at least one contextual feature in connection with the image and processing the tokens and the at least one contextual feature using a self-attention technique and an adaptive halting module for receiving the tokens from the transformer block, the adaptive halting module comprising updating the halting scores associated with the tokens and discarding ones of the tokens having halting scores greater than or equal to a predetermined threshold score, wherein the non-discarded tokens comprise remaining tokens.

Example 11 provides the system of example 10, wherein the halting transformer layer comprises a first halting transformer layer, the system further comprising a next halting transformer layer for receiving the remaining tokens from the first halting transformer layer.

Example 12 provides the system of example 10 or 11, wherein the halting transformer layer comprises a number of halting transformer layers, the system further comprising a task-specific process for receiving the remaining tokens from a last one of the number of halting transformer layers.

Example 13 provides the system of example 12, wherein the image is a bird's-eye view image and the task specific process is a three-dimensional object recognition process.

Example 14 provides the system of any of examples 10-13, wherein the at least one contextual feature comprises at least one of a speed of a vehicle, a weather condition, an environmental condition, a time of day, a road type, traffic density, pedestrian density, a geographic location, and an amount of free space in front of the vehicle.

Example 15 provides the system of any of examples 10-14, wherein the at least one contextual feature is determined using data generated by onboard sensors of the vehicle.

Example 16 provides the system of any of examples 10-15, wherein the at least one contextual feature is determined using mapping data of the vehicle.

Example 17 provides the system of any of examples 10-16, wherein the ViT comprises a hierarchical transformer comprising a representation computed with shifted windows.

Example 18 provides one or more non-transitory computer-readable storage media comprising instruction for execution which, when executed by a processor, are operable to adaptive image inference resolution, the operations comprising receiving image data comprising an image in connection with a vehicle, wherein the image data is generated by at least one onboard sensor of the vehicle; dividing the received image data into a plurality of patches; generating image tokens for the patches; determining at least one contextual feature in connection with the image data and generating a contextual features token for the at least one contextual feature; processing the image tokens and the contextual features token using a vision transformer to adjust a resolution of the received image data based on the at least one contextual feature; and subsequently to the processing, providing the image data to a task-specific application for processing.

Example 19 provides the one or more non-transitory computer-readable storage media of example 18, wherein the at least one contextual feature comprises at least one of a speed of a vehicle, a weather condition, an environmental condition, a time of day, a road type, traffic density, pedestrian density, a geographic location, and an amount of free space in front of the vehicle.

Example 20 provides the one or more non-transitory computer-readable storage media of example 18 of 19, wherein the at least one contextual feature is determined using at least one of data generated by onboard sensors of the vehicle, mapping data of the vehicle, and fleet vehicle data available to a remote data center to which the vehicle is connected.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method for adaptive inference resolution of an image, the method comprising:

dividing the image into a plurality of patches;

generating image tokens for the patches, wherein each of the image tokens includes a halting score associated with the image token;

generating a contextual features token representative of at least one contextual feature in connection with the image;

processing the image tokens and the contextual features token using a vision transformer block;

performing adaptive halting on the image tokens output from the vision transformer block, the adaptive halting comprising updating the halting scores associated with the image tokens and discarding ones of the image tokens having halting scores greater than or equal to a predetermined threshold score, wherein non-discarded image tokens comprise remaining image tokens; and forwarding the remaining image tokens to a next processing block.

2. The method of claim 1, wherein the next processing block is a transformer block of a next transformer layer.

3. The method of claim 1, wherein the next processing block is a task-specific process.

4. The method of claim 1, wherein the at least one contextual feature comprises at least one of a speed of a vehicle, a weather condition, an environmental condition, a time of day, a road type, traffic density, pedestrian density, a geographic location, and an amount of free space in front of the vehicle.

5. The method of claim 1, wherein the at least one contextual feature is determined using data generated by sensors installed on a vehicle.

6. The method of claim 1, wherein the at least one contextual feature is determined using mapping data.

7. The method of claim 1, wherein the at least one contextual feature is determined using fleet vehicle data available to a remote data center.

8. The method of claim 1, wherein the image is a bird's-eye view (BEV) image.

9. The method of claim 1, wherein the image comprises a light detection and ranging (LIDAR) point cloud.

10. A system for performing adaptive inference resolution of an image in connection with a vehicle, the system comprising:

a tokenizer for dividing the image into a plurality of patches and generating tokens for the patches, wherein each of the tokens includes a halting score associated with the token; and a halting transformer layer comprising:

a vision transformer (ViT) for receiving the tokens and at least one contextual feature in connection with the image and processing the tokens and the at least one contextual feature using a self-attention technique; and an adaptive halting module for receiving the tokens from the transformer block, the adaptive halting module comprising updating the halting scores associated with the tokens and discarding ones of the tokens having halting scores greater than or equal to a predetermined threshold score, wherein non-discarded tokens comprise remaining tokens.

11. The system of claim 10, wherein the halting transformer layer comprises a first halting transformer layer, the system further comprising a next halting transformer layer for receiving the remaining tokens from the first halting transformer layer.

12. The system of claim 10, wherein the halting transformer layer comprises a number of halting transformer layers, the system further comprising a task-specific process for receiving the remaining tokens from a last one of the number of halting transformer layers.

13. The system of claim 12, wherein the image is a bird's-eye view image and the task specific process is a three-dimensional object recognition process.

14. The system of claim 10, wherein the at least one contextual feature comprises at least one of a speed of the vehicle, a weather condition, an environmental condition, a time of day, a road type, traffic density, pedestrian density, a geographic location, and an amount of free space in front of the vehicle.

15. The system of claim 10, wherein the at least one contextual feature is determined using data generated by onboard sensors of the vehicle.

16. The system of claim 10, wherein the at least one contextual feature is determined using mapping data of the vehicle.

17. The system of claim 10, wherein the ViT comprises a hierarchical transformer comprising a representation computed with shifted windows.

* * * * *